US012603353B2

(12) United States Patent
Jung et al.

(10) Patent No.: US 12,603,353 B2
(45) Date of Patent: Apr. 14, 2026

(54) BATTERY PACK CASE, AND BATTERY PACK INCLUDING THE SAME

(71) Applicant: Sk On Co., Ltd., Seoul (KR)

(72) Inventors: Jun Hee Jung, Daejeon (KR); Jae Il Hwang, Daejeon (KR); Min Song Kang, Daejeon (KR); Bon Seok Ku, Daejeon (KR); Sei Hoon Cho, Daejeon (KR); Jin Su Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 782 days.

(21) Appl. No.: 17/560,567

(22) Filed: Dec. 23, 2021

(65) Prior Publication Data

US 2022/0209332 A1     Jun. 30, 2022

(30) Foreign Application Priority Data

Dec. 24, 2020   (KR) ......................... 10-2020-0183001

(51) Int. Cl.
*H01M 10/6566*     (2014.01)
*B60K 1/04*     (2019.01)
(Continued)

(52) U.S. Cl.
CPC ........... *H01M 10/6566* (2015.04); *B60K 1/04* (2013.01); *B60L 50/64* (2019.02); *B60L 50/66* (2019.02); *H01M 10/613* (2015.04); *H01M 10/625* (2015.04); *H01M 50/211* (2021.01); *H01M 50/291* (2021.01); *H01M 50/533* (2021.01); *H01M 2220/20* (2013.01)

(58) Field of Classification Search
CPC ........... H01M 10/6566; H01M 10/625; H01M 50/35; H01M 50/358; H01M 50/30; H01M 10/613; H01M 50/211; H01M 50/291; H01M 50/533; H01M 2220/20; B60K 1/04; B60L 50/64; B60L 50/66
See application file for complete search history.

(56) References Cited

U.S. PATENT DOCUMENTS

2012/0164490 A1*  6/2012  Itoi ..................... H01M 50/358
                                                                   429/82
2012/0231306 A1   9/2012  Herron et al.
(Continued)

FOREIGN PATENT DOCUMENTS

CN        111668409 A     9/2020
EP         2506336 A1    10/2012
(Continued)

*Primary Examiner* — Matthew T Martin
*Assistant Examiner* — Felicity B Alban
(74) *Attorney, Agent, or Firm* — The Webb Law Firm

(57) ABSTRACT

The following disclosure relates to a battery pack case, and more particularly, to a battery pack case in which an internal space defined by a plate and an outer frame is partitioned into a plurality of module spaces so that a plurality of battery modules are individually seated and in which a plurality of channels are formed inside a left frame and a right frame of the outer frame and have a structure in which they are in communication with internal spaces of each of the plurality of partitioned module spaces to be able to discharge a harmful material generated at the time of occurrence of an issue in the battery module to the outside through the plurality of channels.

14 Claims, 7 Drawing Sheets

(51) Int. Cl.

| | |
|---|---|
| *B60L 50/60* | (2019.01) |
| *B60L 50/64* | (2019.01) |
| *H01M 10/613* | (2014.01) |
| *H01M 10/625* | (2014.01) |
| *H01M 50/211* | (2021.01) |
| *H01M 50/291* | (2021.01) |
| *H01M 50/533* | (2021.01) |

(56)     References Cited

U.S. PATENT DOCUMENTS

| | | | | |
|---|---|---|---|---|
| 2017/0331164 A1* | 11/2017 | Kwon | ................. | H01M 10/625 |
| 2019/0140235 A1 | 5/2019 | Lindstrom et al. | | |
| 2020/0152941 A1* | 5/2020 | Wynn | ................... | H01M 50/30 |
| 2020/0203788 A1 | 6/2020 | Kang | | |
| 2022/0131117 A1* | 4/2022 | Anandarajah | ......... | H01M 50/20 |
| 2022/0158288 A1* | 5/2022 | Baek | ................... | H01M 10/647 |

FOREIGN PATENT DOCUMENTS

| | | | | | |
|---|---|---|---|---|---|
| EP | 2757612 | A1 * | 7/2014 | .............. | B60L 50/64 |
| JP | 4940892 | B2 | 5/2012 | | |
| JP | 5749200 | B2 | 7/2015 | | |
| KR | 1020160082073 | A | 7/2016 | | |
| KR | 1020190022485 | A | 3/2019 | | |
| KR | 1020190087744 | A | 7/2019 | | |
| KR | 102061827 | B1 | 1/2020 | | |
| KR | 1020200110081 | A | 9/2020 | | |

* cited by examiner

250

C-n
(C-1)

500

200
(220)

BATTERY PACK CASE, AND BATTERY PACK INCLUDING THE SAME

CROSS-REFERENCE TO RELATED APPLICATION

This application claims priority to Korean Patent Application No. 10-2020-0183001 filed Dec. 24, 2020, the disclosure of which is hereby incorporated by reference in its entirety.

BACKGROUND OF THE INVENTION

Field of the Invention

The following disclosure relates to a battery pack case, and more particularly, to a battery pack case in which an internal space defined by a plate and an outer frame is partitioned into a plurality of module spaces so that a plurality of battery modules are individually seated and in which a plurality of channels are formed inside a left frame and a right frame of the outer frame and have a structure in which they are in communication with internal spaces of each of the plurality of partitioned module spaces to be able to discharge a harmful material generated at the time of occurrence of an issue in the battery module to the outside through the plurality of channels.

Description of Related Art

A secondary battery easily applied according to a product group and having electrical characteristics such as a high energy density has been generally applied to an electric vehicle (EV) or a hybrid vehicle (HEV) driven by an electrical driving source as well as a portable device. Such a secondary battery has attracted attention as a new energy source for eco-friendliness and energy efficiency improvement due to an advantage that a by-product due to the use of energy is not generated at all as well as a primary advantage that the use of fossil fuels may be significantly decreased.

Types of secondary batteries currently widely used include a lithium ion battery, a lithium polymer battery, a nickel cadmium battery, a nickel hydride battery, a nickel zinc battery, and the like. An operating voltage of such a unit secondary battery cell, that is, a unit battery cell, is about 2.5V to 4.6V. Therefore, when a higher output voltage is required, a battery pack is configured by connecting a plurality of battery cells to each other in series. Alternatively, a battery pack is configured by connecting a plurality of battery cells to each other in parallel according to a charge/discharge capacity required for the battery pack. Therefore, the number of battery cells included in the battery pack may be variously set according to the required output voltage or charge/discharge capacity.

Meanwhile, when the battery pack is configured by connecting the plurality of battery cells to each other in series/parallel, a method of configuring the battery pack by first configuring a battery module including at least one battery cell and adding other components using the at least one battery module is generally used. Here, the battery cells constituting the battery module or the battery pack may be generally provided as pouch-type secondary batteries having an advantage that they may be easily stacked mutually.

In the battery module, a thermal runaway situation in which ignition of the battery cell occurs inside a case may occur due to overcharging or the like. In this case, a high-temperature and high-pressure gas, a flame, metal particles, and the like, may be generated in a trigger cell or a trigger module including the trigger cell. When the flame generated in the trigger module is exposed outside the case, it may lead to greater secondary damage, and when the high-temperature and high-pressure gas may not escape out of the case, it may lead to an explosion or the like of the battery module due to an increase in internal pressure of the case. In order to solve such a problem, in the related art, a venting valve or the like has been provided in a predetermined region of the battery pack case to discharge the gas or the like generated in the trigger module at the time of occurrence of an issue to the outside of the battery pack case.

However, according to such a structure of the battery pack case according to the related art, the venting valve is commonly used in the entire internal space of the battery pack case, and thus, a harmful material generated in the trigger module may be discharged to the outside through the venting valve only after the harmful material is spread to the entire inside of the battery pack, which adversely affects normal modules other than the trigger module.

RELATED ART DOCUMENT

Patent Document (Patent Document 1) Korea Patent No. 2061827 (2019 Dec. 26)

SUMMARY OF THE INVENTION

An embodiment of the present invention is directed to providing a battery pack case in which a plurality of channels are formed inside a left frame and a right frame of an outer frame of the battery pack case and module spaces in which battery modules are individually seated are in communication with respective channels to be able to discharge a harmful material generated at the time of occurrence of an issue in the battery module to the outside through the plurality of channels.

In one general aspect, a battery pack includes: a plate providing a space in which battery modules are seated; an outer frame formed at a predetermined height at an outer side of the plate; and a partition frame partitioning an internal space defined by the plate and the outer frame into a plurality of module spaces, wherein a plurality of channels separated from each other are formed inside at least one of a left frame positioned on the left and a right frame positioned on the right in the outer frame, and an internal space of each of the plurality of module spaces is in communication with at least any one of the plurality of channels.

The plurality of channels may be formed in a straight line shape in which at least one of one ends and the other ends thereof are opened, respectively, and be stacked in a height direction to be formed in a multifloor structure.

The battery pack may further include a front vent cap provided at one end portion of the left frame and/or the right frame and having one or more vent holes formed therein and a rear vent cap provided at the other end portion of the left frame and/or the right frame and having one or more vent holes formed therein, wherein the opened one ends of some of the plurality of channels are in communication with the outside through the vent holes formed in the front vent cap, and the opened one ends of the others of the plurality of channels are closed by a surface of the front vent cap in which the vent holes are not formed, and the opened other ends of some of the plurality of channels are closed by a surface of the rear vent cap in which the vent holes are not formed, and the opened other ends of the others of the plurality of channels are in communication with the outside through the vent holes formed in the rear vent cap.

The battery pack may further include a guide wall disposed on each channel and guiding a gas to the vent hole corresponding to each channel.

The plurality of module spaces may be disposed in two columns, a plurality of left channels separated from each other may be formed inside the left frame, and a plurality of right channels separated from each other may be formed inside the right frame, the number of module spaces of a first column disposed on the left among the plurality of module spaces disposed in the two columns may be the same as the number of left channels, and the number of module spaces of a second column disposed on the right among the plurality of module spaces disposed in the two columns may be the same as the number of right channels.

An internal space of each of the module spaces of the first column may be in communication with each of the plurality of left channels in a one-to-one manner, and an internal space of each of the module spaces of the second column may be in communication with each of the plurality of right channels in a one-to-one manner.

The plurality of left channels may be formed in a straight line shape in which at least one of one ends and the other ends thereof are opened, respectively, and be stacked in a height direction to be formed in a multifloor structure, and the plurality of right channels may be formed in a straight line shape in which at least one of one ends and the other ends thereof are opened, respectively, and be stacked in the height direction to be formed in a multifloor structure.

The battery pack may further include: a front vent cap for the left frame provided at one end portion of the left frame and having one or more vent holes formed therein and a rear vent cap for the left frame provided at the other end portion of the left frame and having one or more vent holes formed therein; and a front vent cap for the right frame provided at one end portion of the right frame and having one or more vent holes formed therein and a rear vent cap for the right frame provided at the other end portion of the right frame and having one or more vent holes formed therein, wherein the opened one ends of some of the plurality of left channels are in communication with the outside through the vent holes formed in the front vent cap for the left frame, and the opened one ends of the others of the plurality of left channels are closed by a surface of the front vent cap for the left frame in which the vent holes are not formed, the opened other ends of some of the plurality of left channels are closed by a surface of the rear vent cap for the left frame in which the vent holes are not formed, and the opened other ends of the others of the plurality of left channels are in communication with the outside through the vent holes formed in the rear vent cap for the left frame, the opened one ends of some of the plurality of right channels are in communication with the outside through the vent holes formed in the front vent cap for the right frame, and the opened one ends of the others of the plurality of right channels are closed by a surface of the front vent cap for the right frame in which the vent holes are not formed, and the opened other ends of some of the plurality of right channels are closed by a surface of the rear vent cap for the right frame in which the vent holes are not formed, and the opened other ends of the others of the plurality of right channels are in communication with the outside through the vent holes formed in the rear vent cap for the right frame.

The battery pack may further include: a guide wall for the left channel disposed on each left channel and guiding a gas to the vent hole corresponding to each left channel; and a guide wall for the right channel disposed on each right channel and guiding a gas to the vent hole corresponding to each right channel.

In each left channel, an end portion having a greater distance of a distance from a communication hole formed in each left channel to one end of each left channel and a distance from the communication hole to the other end of each left channel may be in communication with the outside, and in each right channel, an end portion having a greater distance of a distance from a communication hole formed in each right channel to one end of each right channel and a distance from the communication hole to the other end of each right channel may be in communication with the outside.

In each left channel, an end portion that is in communication with the outside, of one end and the other end of a left channel of any one floor of left channels of two floors adjacent to each other and an end portion that is in communication with the outside, of one end and the other end of a left channel of the other floor of the left channels of the two floors adjacent to each other may be opposite to each other, and in each right channel, an end portion that is in communication with the outside, of one end and the other end of a right channel of any one floor of right channels of two floors adjacent to each other and an end portion that is in communication with the outside, of one end and the other end of a right channel of the other floor of the right channels of the two floors adjacent to each other may be opposite to each other.

The internal space of each of the plurality of module spaces may include a battery assembly formed by stacking a plurality of battery cells each including an electrode tab lead portion and a heat exchange portion and a heat conduction member disposed between the heat exchange portion and the plate, and the electrode tab lead portion may include a sealed surface formed by thermally compressing a pouch accommodating an electrode assembly, and the heat exchange portion may be in contact with the heat conduction member without the sealed surface.

The electrode tab lead portion may further include a corner portion at one end thereof, and the corner portion may protrude more toward the plate than the heat exchange portion, and the plate may include a step portion for accommodating the protruding corner portion.

In another general aspect, an electric vehicle includes the battery pack as described above; and a motor receiving power supplied from the battery pack.

DETAILED DESCRIPTION OF MAIN ELEMENTS

Figure 1:
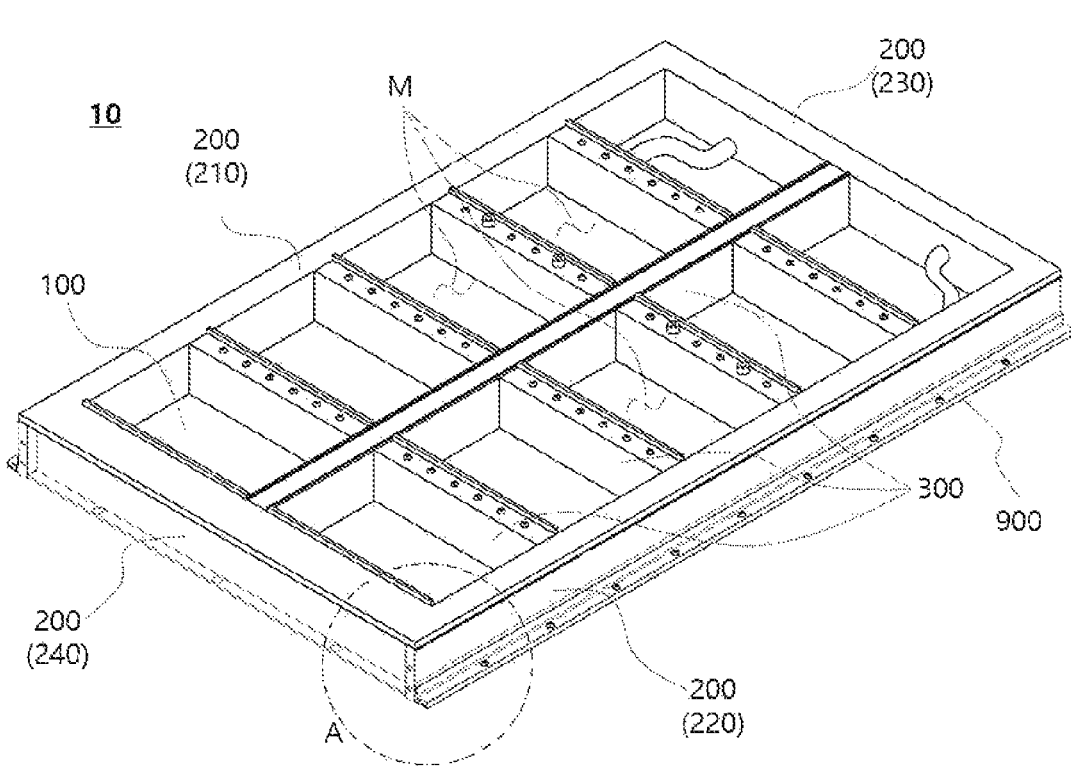
FIG. 1 is a schematic perspective view illustrating a battery pack case according to an embodiment of the present invention.

1: battery pack
10: battery pack case
100: plate
110: step portion
200: outer frame
210, 220, 230, 240: left, right, front, and rear frames
250: communication hole
300: partition frame
400: vent cap
410, 420: front vent cap, rear vent cap
410_left: front vent cap for left frame
420_right: rear vent cap for left frame
410_left: front vent cap for right frame
420_right: rear vent cap for right frame
450: vent hole
500: guide wall
M: a plurality of module spaces
M_left, M_right: module space of first column, module space of second column
C: a plurality of channels
C_left, C_right: left channel, right channel
600: battery cell assembly
610: battery cell
611: electrode tab lead portion
612: sealed surface
613: corner portion
615: heat exchange portion
700: heat conduction member

DESCRIPTION OF THE INVENTION

Hereinafter, the present invention will be described in detail with reference to the accompanying drawings.

Figure 2:
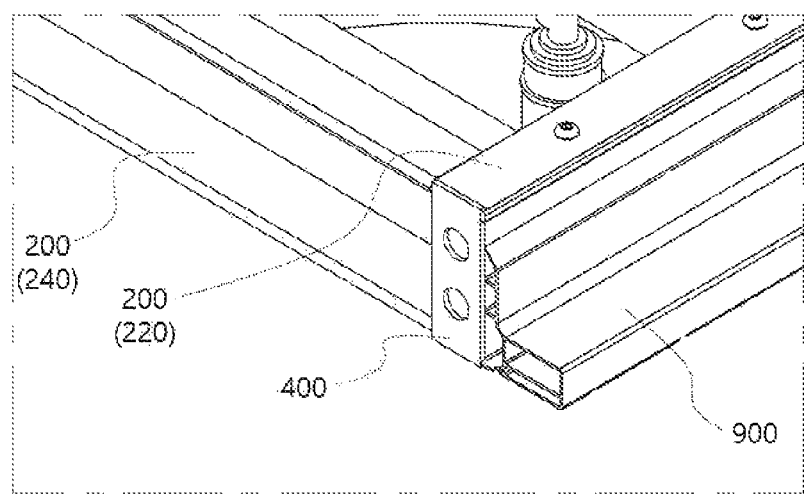
FIG. 2 is an enlarged view of one end portion of a right frame, which is region A in FIG. 1.
Figure 3:
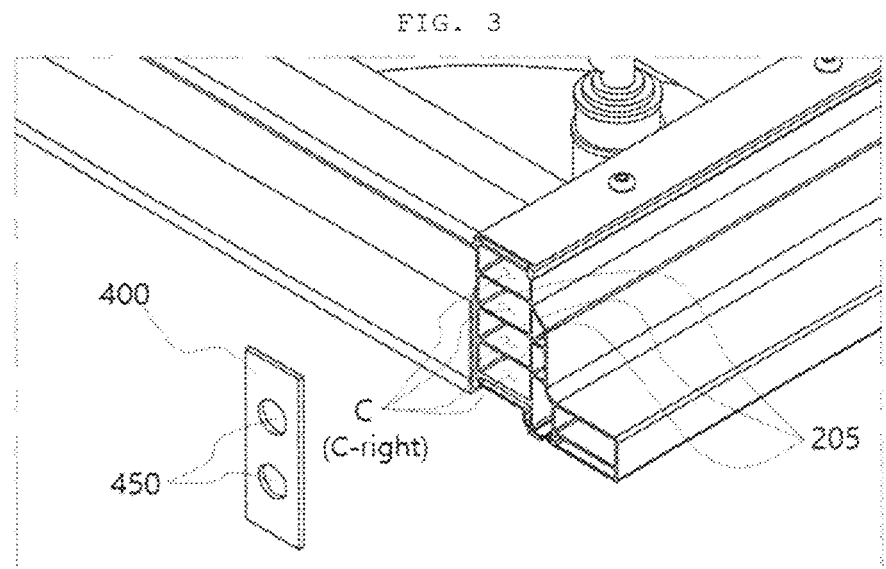
FIG. 3 is an exploded perspective view of FIG. 2.

FIG. 1 is a schematic perspective view illustrating a battery pack case according to an embodiment of the present invention, FIG. 2 is an enlarged view of one end portion of a right frame, which is region A in FIG. 1, and FIG. 3 is an exploded perspective view of FIG. 2.

As illustrated in FIGS. 1 to 3, the battery pack case 10 according to the present invention may include a plate 100 providing a space in which battery modules are seated; an outer frame 200 formed at a predetermined height at an outer side of the plate; and a partition frame 300 partitioning an internal space defined by the plate and the outer frame into a plurality of module spaces so that the battery modules are individually seated, and may further include various types of support structures 900 for supporting the battery pack case 10 on the left and the right of the outer frame.

The plate 100 provides the space in which the battery modules are seated, may be configured in a flat plate shape having an approximately large area, and may be positioned below the battery modules to cover lower portions of the battery module.

The outer frame 200 is formed at the predetermined height at the outer edge of the plate, may include a left frame 210, a right frame 220, a front frame 230, and a rear frame 240 positioned at the left, the right, the front, and the rear of the plate along an outer circumference of the plate, respectively, and may be disposed on the left, the right, the front, and the rear of the plate, respectively, to cover side surfaces of the battery modules.

The partition frame 300 partitions the internal space defined in a box shape by the plate and the outer frame into a plurality of zones, may be formed by arranging one or more center beams and cross beams in a grid shape, and may be formed at the same height as the outer frame. The internal space of the battery pack case defined by the plate and the outer frame may be partitioned into the plurality of zones by the partition frame, and the battery modules may be individually seated in each of the corresponding zones. In this case, each of the corresponding zones will be defined as a module space (M) in the present invention.

Here, in the present invention, a plurality of channels C separated from each other may be formed inside at least one of the left frame 210 and the right frame 220 (hereinafter, in the present specification, a phrase "at least any one or more of the left frame and the right frame" may be mentioned as the "left frame and/or the right frame"), in the outer frame 200 described above, and an internal space of each of the plurality of module spaces M described above may be independently in communication with at least any one of the plurality of channels.

More specifically, when the plurality of channels C (right channels C_right) are formed in the right frame 220, an inner portion of the right frame is formed in a pipe shape having a hollow structure, such that the right frame may be formed in a shape in which one end and the other end thereof are opened and the inner portion thereof is hollow, one or more dividing walls 205 dividing a hollow internal space of the right frame into an upper space and a lower space are provided in an axial direction, such that the hollow internal space of the right frame may be partitioned into a plurality of spaces in a height direction. Therefore, the respective partitioned internal spaces inside the right frame may form a multifloor structure.

Each of the internal spaces of the right frame partitioned and separated from each other as described above corresponds to each of the plurality of channels C according to the present invention. That is, in the present invention, a plurality of hollows separated from each other in the height direction may be formed along the axial direction inside the right frame, and each hollow may be used as the channel. Due to such a structure, as illustrated in FIG. 3, the plurality of channels C formed inside the right frame 220 may be formed in a straight line shape in which one ends and the other ends thereof are opened, respectively, and may be stacked in the height direction to be formed in a multifloor structure. Hereinafter, in the present specification, if necessary, a channel of any one floor among the plurality of channels formed in the multifloor structure will be denoted by C-n, and the other channels will be denoted by C-1, C-2 and the like in order from a channel of the lowest floor.

Figure 4A:
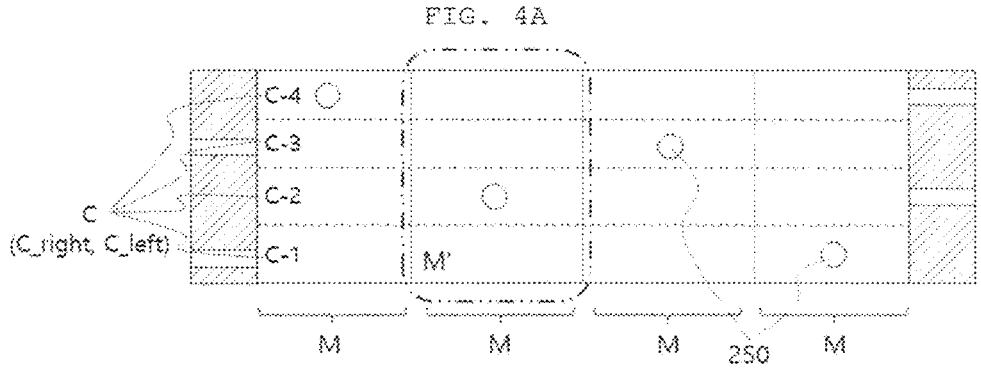
FIGS. 4A and 4B are conceptual diagrams illustrating a connection relationship between a module space and a channel.
Figure 4B:
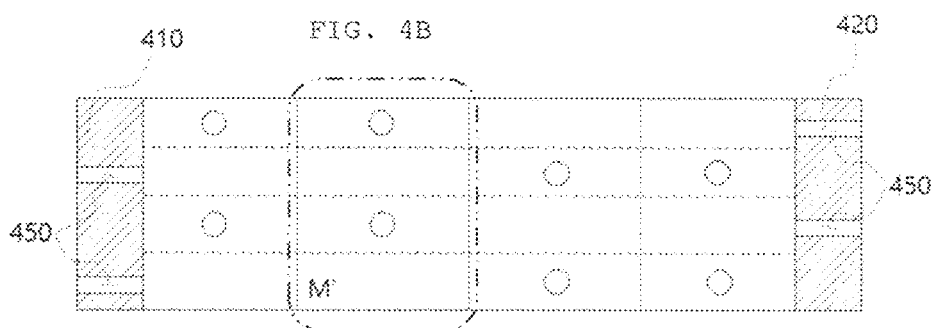

Here, a communication hole 250 is formed in an inner sidewall of the right frame positioned in the internal space of each of the plurality of module spaces M described above, and the module space M may be in communication with the channel C through the communication hole 250. In this case, each module space M may be in communication with at least one of the plurality of channels C. FIGS. 4A and 4B are conceptual diagrams illustrating a connection relationship between the module space and the channel. The communication hole 250 is formed in the inner sidewall of the right frame 220 positioned in the internal space of each module area M, and each module space M and each channel C may be in communication with each other through the communication hole 250.

For example, as illustrated in FIGS. 4A and 4B, all of the channels C formed inside the right frame are formed to pass through each module space M, and all of the channels C are formed to pass through the inner portion of the right frame positioned in any one module space M' on the basis of any one module space M'. In this case, only one communication hole 250 is formed in an inner sidewall of the right frame positioned in one module space M' so that one module space M' is in communication with only any one channel C-n of all channels C corresponding to one module space M', as illustrated in FIG. 4A, or a plurality of communication hole 250 (two communication holes in FIG. 4B) are formed in an inner sidewall of the right frame positioned in one module space M' so that one module space M' is simultaneously in communication with one or more channels C-n of all channels C corresponding to one module space M, as illustrated in FIG. 4B. Through such a structure, the internal space of each of the module spaces M according to the present invention may be in communication with at least any one of the plurality of channels C. In addition, a structure of a plurality of channels C (left channels C_left) formed in the left frame 210 is the same as that of the plurality of right channels C_right formed in the right frame 220 described above, and a description therefor will thus be omitted.

In the battery pack case 10 illustrated in FIG. 1, the internal space of the battery pack case is partitioned into two columns and four rows, such that the module spaces may be formed in two columns and four rows, and the plurality of channels C are formed inside both the left frame 210 and the right frame 220, such that each of module spaces M_left disposed in a first column, which is the left, may be in communication with at least any one of the plurality of channels C_left formed in the left frame 210, and each of module spaces M_right disposed in a second column, which is the right, may be in communication with at least any one of the plurality of channels C_right formed in the right frame 220. Here, when the internal space of the battery pack case 10 is partitioned into one column rather than two columns, the channels may be formed in only one of the left frame 210 and the right frame 220, and even when the internal space is partitioned into one column, the channels may be formed in both the left frame 210 and the right frame 220.

Furthermore, although not illustrated, the battery pack case according to the present invention may further include an upper cover provided above the outer frame 200 to cover the battery modules individually seated in the plurality of module spaces M. The upper cover is provided, such that each module space M may be formed as a space that is closed substantially or relatively as compared with the outside.

The battery pack case 10 according to the present invention may be formed in the structure as described above. According to such a structure, each module space M is separated from the other module spaces M and is formed as the closed space, and may be in communication with at least one of the plurality of channels C formed inside the left frame 210 and/or the right frame to be finally in communication with the outside. Therefore, a harmful material (a gas, a flame or the like) generated when an issue occurs in any one trigger module of the battery modules seated in the respective module spaces is not spread to the entire internal space of the battery pack case, but may be spread only within the module space in which the trigger module is seated, be introduced into one or more channels that are in communication with the module space through the communication holes, and be then discharged to the outside, such that an adverse effect on normal modules other than the trigger module may be minimized.

Furthermore, referring to FIG. 3 again, the battery pack case 10 according to the present invention may further include a vent cap 400 provided at both end portions of the left frame 210 and/or the right frame 220. The vent cap 400 may include a front vent cap 410 provided at one end portion of the left frame 210 and/or the right frame 220 in which the plurality of channels C described above are formed and a rear vent cap 420 provided at the other end portion of the left frame 210 and/or the right frame 220 in which the plurality of channels C described above are formed, and at least one vent hole 450 may be formed in each of the front vent cap 410 and the rear vent cap 420.

In the present invention, the vent cap 400 is configured as a set of the front vent cap 410 and the rear vent cap 420, and the respective vent caps 410 and 420 are formed in a plate shape to cover one end and the other end of each of the plurality of channels C. Therefore, the vent caps 410 and 420 may basically close the opened one end or the opened other end of each channel C, respectively, and allow any one of one end and the other end of each channel C to be in communication with the outside through the vent hole 450 formed in each vent cap 400 to open any one of the opened one end and the opened other end of each channel C and close the other of the opened one end and the opened other end of each channel C.

That is, referring to FIG. 4 again, the vent cap 400 may include the front vent cap 410 and the rear vent cap 420, which are provided in front of and behind each channel C, respectively. Describing this on the basis of one channel, the vent hole 450 is formed in a vent cap portion positioned at a front end of one channel (that is, one end portion of one channel), such that the front end of one channel may be in communication with the outside, and the vent hole 450 is not formed in a vent cap portion positioned at a rear end of one channel (that is, the other end portion of one channel), such that the rear end of one channel may be closed by the vent cap. As described above, the front vent cap 410 and the rear vent cap 420 may be provided in front of and behind each channel C, respectively, to discharge the harmful material generated in any one trigger module and introduced into each channel in a desired direction.

Figure 5:
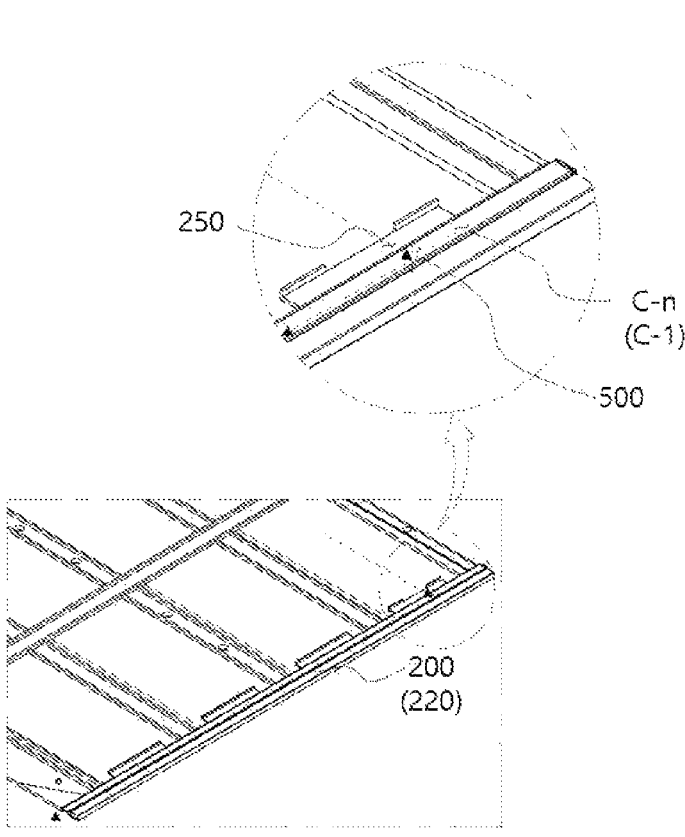
FIG. 5 is a view illustrating one channel, a communication hole, and a guide wall.

Here, the battery pack case according to the present invention may further include a guide wall 500 disposed on each channel in order to guide the harmful material introduced from the trigger module into each channel to the end portion at which the vent hole 450 is formed. FIG. 5 is a view illustrating one channel, a communication hole, and a guide wall. FIG. 5 illustrates a channel C-n of any one floor (in particular, a channel C-1 of a first floor in FIG. 5) of the plurality of channels C formed inside the right frame 220 and having a floor structure, a communication hole 250 that is in communication with the channel C-1, and a guide wall 500 provided on the channel C-1. As illustrated in FIG. 5, the guide wall 500 may be disposed at one point on each channel C to guide the gas or the like, which is the harmful material, from one point to an end that is in communication with the outside, of one end and the other end of each channel C. The guide wall 500 may be formed in various shapes, and may serve to separate an internal space of the corresponding channel into one direction and the other direction on the basis of one point, close one of the two directions, and open the other direction of the two directions. To this end, the guide wall 500 may be configured to have a height that is substantially the same as that of each channel C.

As described above, the guide wall may be provided in each channel to prevent the gas or the like generated in the trigger module and introduced into each channel from moving to the end portion closed by the vent cap, and then return and be again introduced into the module space where the trigger module exists, and may be combined with a function of the vent cap to certainly discharge the harmful material in a desired direction.

Hereinafter, an exemplary embodiment will be described on the basis of the configurations of the present invention described above.

In an exemplary embodiment of the present invention, in particular, each of the plurality of channels formed inside each of the left frame and the right frame is in communication with each module space in a one-to-one manner, such that one dedicated channel may be provided in each module space.

Specifically, the plurality of module spaces M may be disposed in two columns as illustrated in FIG. 1. Therefore, the plurality of left channels C_left and the plurality of right channels C_right separated from each other may be formed inside the left frame 210 and the right frame 220, respectively. Here, the number of module spaces M_left of the first column disposed on the left among the plurality of module spaces M disposed in two columns may be the same as the number of left channels C_left, and the number of module spaces M_right of the second column among the plurality of module spaces M disposed in two columns may be the same as the number of right channels C_right. That is, for example, as illustrated in FIG. 1, when the number of module spaces M_left of the first column is four, an internal space of the left frame 210 is also formed in a hollow structure of four floors, such that four left channels C-1_left, C-2_left, C-3_left, and C-4_left may be formed. In addition, the module spaces M_right of the second column, the right frame 220, and the right channels C_right may have the same structures as those described above. As described above, according to an exemplary embodiment of the present invention, a left region and a right region have the same structure on the basis of a center beam of the battery pack case 10, such that the battery pack case 10 may be formed in a symmetrical shape in a horizontal direction. Since the module spaces and the channels are configured as described above, the numbers of module spaces and the numbers of channels may be configured to be the same as each other.

In this case, an internal space of each of the module spaces M_left of the first column may be in communication with each of the plurality of left channels C_left in a one-to-one manner through the communication hole 250 formed in the inner sidewall of the left frame 210 positioned in the module spaces of the first column. That is, unlike the general case described above, according to the present exemplary embodiment, only one communication hole is formed in the inner sidewall of the left frame positioned in each of the module spaces of the first column, such that each of the module spaces M_left of the first column may be in communication with each of the left channels C_left in a one-to-one manner (see FIG. 4A). As described above, each module space has a dedicated channel, such that each module space may be completely independent from the other module spaces. Therefore, it is possible to more safely protect the normal module from the trigger module by certainly blocking the harmful material generated in the trigger module of any one module space from being spread to the other module spaces.

Figure 6:
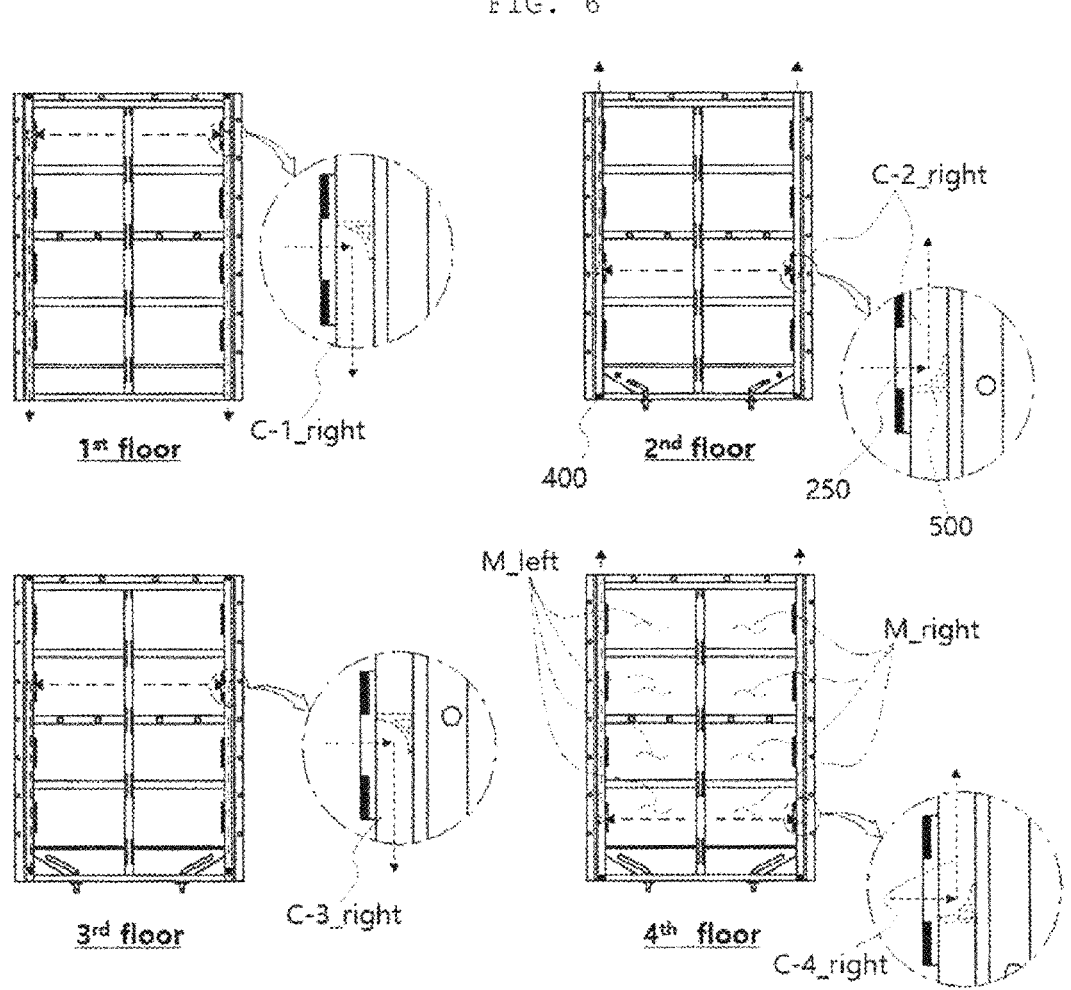
FIG. 6 is an exploded view of the battery pack case illustrating each channel for each floor.

FIG. 6 is an exploded view of the battery pack case illustrating each channel for each floor, and illustrates the plurality of channels C_left and C_right constituting a floor structure inside the left frame 210 and the right frame 220, respectively, for each floor. In this case, a first-floor right channel C-1_right formed at the lowermost portion of the right frame 220 may be in communication with a module space positioned at the uppermost portion in FIG. 6 among the module spaces of the first column, a second-floor right channel C-2_right formed on an upper floor of the first-floor right channel may be in communication with a third module space from the top among the module spaces of the first column, a third-floor right channel C-3_right formed on an upper floor of the second-floor right channel may be in communication with a second module space from the top among the module spaces of the first column, and a fourth-floor right channel C-4_right formed on an upper floor of the third-floor right channel may be in communication with a fourth module space from the top among the module spaces of the first column, and the left region may be formed in the same structure as the right region. As described above, according to the present invention, any one module space is in communication with any one channel in a one-to-one manner, such that each module space may have a dedicated channel.

In addition, also in the present exemplary embodiment, as described above, the vent cap 200 is provided at each of one end and the other end of the left frame and the right frame, such that a front vent cap 410_left and a rear vent cap 420_left for the left frame and a front vent cap 410_right and a rear vent cap 420_right for the right frame may be provided. Furthermore, the guide wall 500 may be further provided on each channel C. Specifically, a guide wall 500 left for the left channel may be provided on each left channel C_left, and a guide wall 500_right for the right channel may be provided on each right channel C_right.

Here, according to the present embodiment, an end portion having a greater distance of a distance from the communication hole 250 formed in each left channel C_left to one end of the corresponding left channel C_left and a distance from the communication hole 250 to the other end of the corresponding left channel C_left may be in communication with the outside, and the right region may also be formed in the same structure as that described above. That is, each channel may have a structure in which an end portion thereof farther from the communication hole 250 is in communication with the outside, and the vent hole 450 may be formed in the vent cap 400 to correspond to such a structure. This is to allow the harmful material introduced from each module space M into each channel C through the communication hole 250 to flow along the longest path until the harmful material is discharged to the outside, and a temperature of a high-temperature and high-pressure gas, flame material or the like is lowered while the high-temperature and high-pressure gas, flame material or the like is flowing along the longest path of each channel C, such that the high-temperature and high-pressure gas, flame material or the like may be discharged in a state in which a risk is the lowest when it is discharged to the outside of the battery pack case 10.

In addition, as illustrated in FIG. 6, left channels C_left of two floors adjacent to each other may be configured so that outlets thereof are opposite to each other as in a structure in which an end portion of the first-floor left channel C-1_left that is in communication with the outside is positioned at a lower side, an end portion of the second-floor left channel C-2_left that is in communication with the outside is positioned at an upper side, an end portion of the third-floor left channel C-3_left that is in communication with the outside is positioned at a lower side, and an end portion of the fourth-floor left channel C-4_left that is in communication with the outside is positioned at an upper side, and the right region may also have the same structure as that described above. This is to make the outlets (vent holes) of the respective channels be spaced as far apart from each other as possible, and it is possible to prevent the harmful material discharged from any one channel from being introduced again into the other channel through an outlet (vent hole) formed at an upper floor or a lower floor immediately adjacent to any one channel.

Meanwhile, although not illustrated, a structure in which a channel is further formed inside the partition frame 300 and is in communication with the plurality of left channels to right channels of the left or right frame may be further added.

As described above, according to the present invention, the plurality of channels may be provided inside the left frame and the right frame to discharge the harmful material generated inside the battery pack case at the time of occurrence of an issue in the battery module through each channel, thereby minimizing additional damage due to the occurrence of the issue.

Hereinafter, a battery cell assembly individually seated in each module space of the battery pack case described above and a battery pack including the same will be described.

Figure 7:
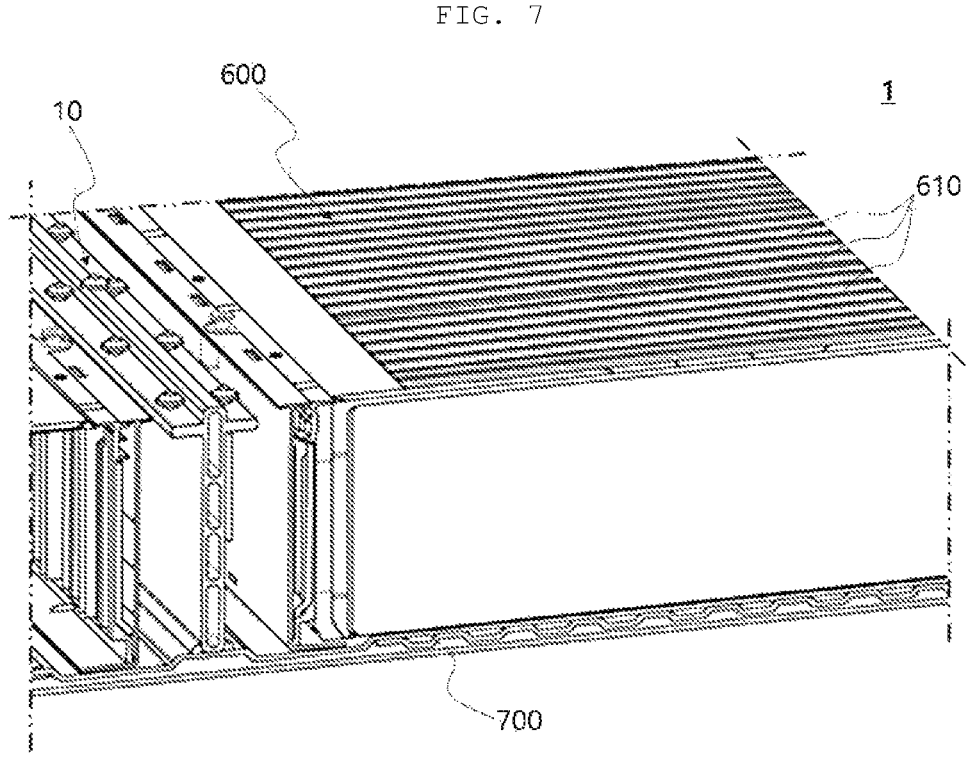
FIG. 7 is a cut-away perspective view of a battery pack according to an embodiment of the present invention.

FIG. 7 is a cut-away perspective view of a battery pack according to an embodiment of the present invention. The battery pack 1 according to the present invention may include a battery pack case 10 in which a plurality of module spaces M are formed, a battery cell assembly 600 provided in an internal space of each of the plurality of module spaces M, and a heat conduction member 700. Here, the battery cell assembly 600 may be formed by stacking a plurality of battery cells 610.

Figure 8:
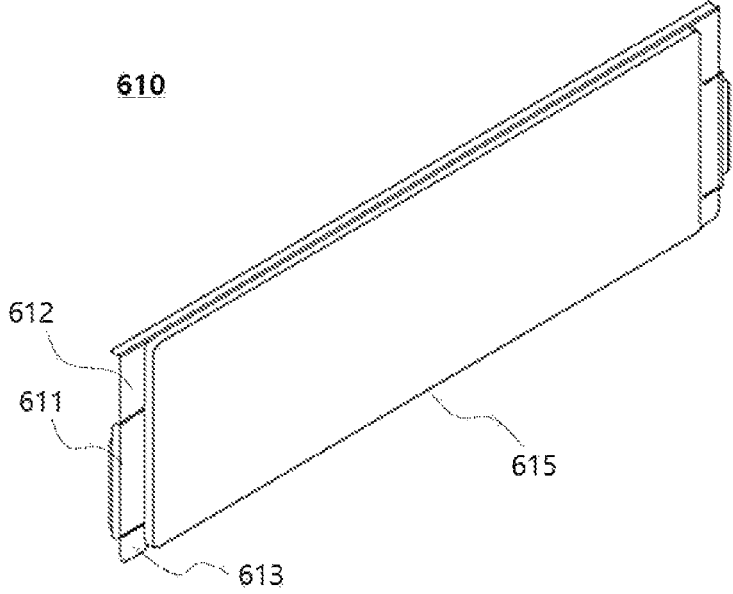
FIG. 8 is a perspective view of a battery cell according to the present invention.

FIG. 8 is a perspective view of the battery cell according to the present invention. The battery cell 610 will be described in detail with reference to FIG. 8. The battery cell 610 may include an electrode tab lead portion 611 formed at one end or both ends thereof and a heat exchange portion 615 dissipating heat to a plate 100 of the battery pack case 10. In this case, the electrode tab lead portion 611 may include a sealed surface 612 formed by thermally compressing a pouch accommodating an electrode assembly of the battery cell 610 while the heat exchange portion 615 may be in direct contact with the heat conduction member 700 without the sealed surface 612 in order to conduct heat well.

Here, the electrode tab lead portion 611 may further include a corner portion 613 at one end thereof. The corner portion 613 may be formed to extend and protrude more toward the plate 100 than a lower surface of the heat exchange portion 615 and may be formed when the sealed surface 612 of the electrode tab lead portion 611 is formed by thermally compressing the pouch.

Figure 9:
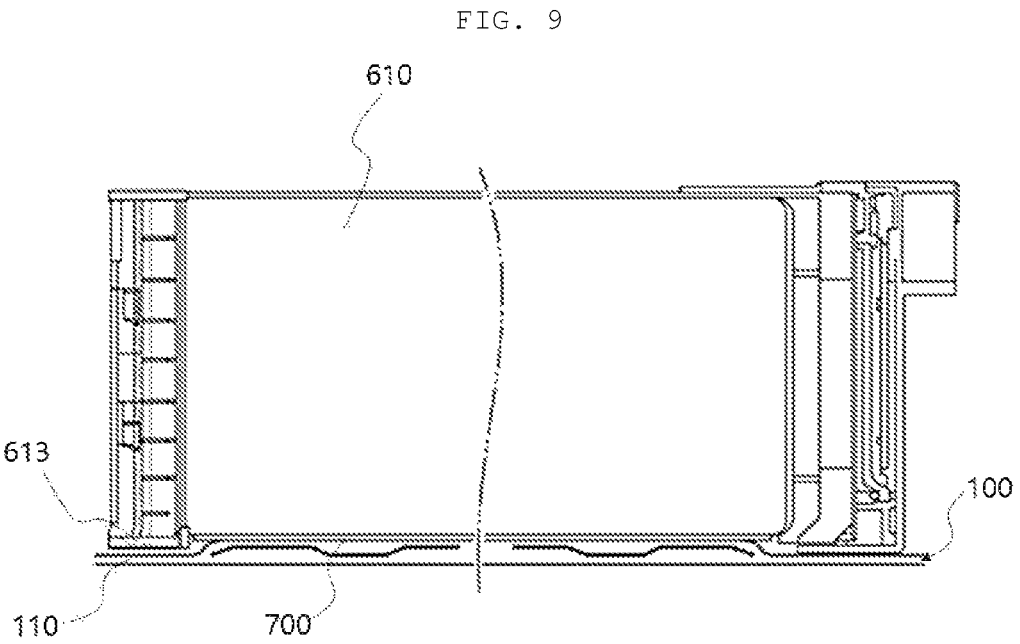
FIG. 9 is a view for describing a coupling relationship between the battery cell and a plate according to the present invention.

FIG. 9 is a view for describing a coupling relationship between the battery cell and the plate according to the present invention. The heat conduction member 700 may be disposed between the heat exchange portion 615 of the battery cell 610 and the plate 100 of the battery pack case 10 to be in thermally close contact with the heat exchange portion 615 of the battery cell 610 and improve heat conduction. A step portion 110 may be formed in the plate 100 so as to accommodate the corner portion 613 of the electrode tab lead portion 611 protruding more toward a bottom portion than the heat exchange portion 615. In addition, the plate 100 may include at least two floors, a refrigerant channel through which a refrigerant may flow may be formed in a first floor of an upper portion of the plate 100, and a hole for forming the step portion 110 may be formed in a second floor of a lower portion of the plate 100.

The battery pack is generally configured by assembling the battery cell, the battery module, and the battery pack in this order. The battery cells are subjected to units called modules and packs in order to be safely and efficiently managed, and a general manufacturing order is to configure a module by bundling several battery cells and configure a pack by bundling several modules. In addition, when configuring the module, a module housing protecting the battery cell from an external shock such as heat and vibration is required, a gas safety device, an electric device and the like are installed inside the module housing, and an additional cooling device may be added in order to improve cooling efficiency deteriorated due to the module housing. Therefore, a restriction in increasing a ratio of a volume of the battery cells to a total internal volume of the battery pack due to components of a module unit is generated.

The battery pack 1 according to the present invention is to improve such a restriction, and the module housing is removed and the battery cell assembly formed of the battery cells is directly coupled to the plate corresponding to a bottom portion of the battery pack case, such that the ratio of the volume of the battery cells may be significantly improved.

According to the present invention, the plurality of channels are formed inside the left frame and the right frame of the outer frame of the battery pack case and the module spaces in which the battery modules are individually seated are in communication with the respective channels to discharge the harmful material generated at the time of occurrence of the issue in the battery module to the outside through the plurality of channels, such that an adverse effect on normal modules other than the trigger module may be minimized.

In this case, each module space is in communication with each channel in a one-to-one manner, and is provided with a dedicated channel, such that each module space may be completely independent from the other module spaces. Therefore, it is possible to more safely protect the normal module from the trigger module by certainly blocking the harmful material generated in the trigger module in any one module space from being spread to the other module spaces.

Although embodiments of the present invention have been hereinabove described with reference to the accompanying drawings, those skilled in the art to which the present invention pertains will be able to understand that the present invention may be implemented in other specific forms without departing from the spirit or essential feature of the present invention. Therefore, it is to be understood that embodiments described hereinabove are illustrative rather than being restrictive in all aspects.

What is claimed is:

1. A battery pack comprising:
a plate providing a space in which battery modules are seated;
an outer frame formed at a predetermined height at an outer side of the plate; and
a partition frame partitioning an internal space defined by the plate and the outer frame into a plurality of module spaces, wherein a plurality of channels separated from each other are formed inside a left frame positioned on the left and a right frame positioned on the right in the outer frame, and an internal space of each of the plurality of module spaces is in communication with one of the plurality of channels, wherein the plurality of module spaces are disposed in two columns, a plurality of left channels separated from each other are formed inside the left frame, and a plurality of right channels separated from each other are formed inside the right frame, the number of module spaces of a first column disposed on the left among the plurality of module spaces disposed in the two columns is the same as the number of left channels, and the number of module spaces of a second column disposed on the right among the plurality of module spaces disposed in the two columns is the same as the number of right channels, wherein an internal space of each of the module spaces of the first column is in communication with each of the plurality of left channels in a one-to-one and mutually isolated manner, such that each of the module space is isolated from other module spaces, and an internal space of each of the module spaces of the second column is in communication with each of the plurality of right channels in a one-to-one and mutually isolated manner, such that each of the module space is isolated from other module spaces.

2. The battery pack of claim 1, wherein the plurality of channels are formed in a straight line shape in which at least one of one ends and the other ends thereof are opened, respectively, and are stacked in a height direction to be formed in a multifloor structure.

3. The battery pack of claim 2, further comprising a front vent cap provided at one end portion of the left frame and/or the right frame and having one or more vent holes formed therein and a rear vent cap provided at the other end portion of the left frame and/or the right frame and having one or more vent holes formed therein, wherein the opened one ends of some of the plurality of channels are in communication with the outside through the vent holes formed in the front vent cap, and the opened one ends of the others of the plurality of channels are closed by a surface of the front vent cap in which the vent holes are not formed, and the opened other ends of some of the plurality of channels are closed by a surface of the rear vent cap in which the vent holes are not formed, and the opened other ends of the others of the plurality of channels are in communication with the outside through the vent holes formed in the rear vent cap.

4. The battery pack of claim 3, further comprising a guide wall disposed in each channel and guiding a gas to the vent hole corresponding to each channel.

5. The battery pack of claim 1, wherein the plurality of left channels are formed in a straight line shape in which at least one of one ends and the other ends thereof are opened, respectively, and are stacked in a height direction to be formed in a multifloor structure, and the plurality of right channels are formed in a straight line shape in which at least one of one ends and the other ends thereof are opened, respectively, and are stacked in the height direction to be formed in a multifloor structure.

6. The battery pack of claim 5, further comprising:

a front vent cap for the left frame provided at one end portion of the left frame and having one or more vent holes formed therein and a rear vent cap for the left frame provided at the other end portion of the left frame and having one or more vent holes formed therein; and a front vent cap for the right frame provided at one end portion of the right frame and having one or more vent holes formed therein and a rear vent cap for the right frame provided at the other end portion of the right frame and having one or more vent holes formed therein, wherein the opened one ends of some of the plurality of left channels are in communication with the outside through the vent holes formed in the front vent cap for the left frame, and the opened one ends of the others of the plurality of left channels are closed by a surface of the front vent cap for the left frame in which the vent holes are not formed, the opened other ends of some of the plurality of left channels are closed by a surface of the rear vent cap for the left frame in which the vent holes are not formed, and the opened other ends of the others of the plurality of left channels are in communication with the outside through the vent holes formed in the rear vent cap for the left frame, the opened one ends of some of the plurality of right channels are in communication with the outside through the vent holes formed in the front vent cap for the right frame, and the opened one ends of the others of the plurality of right channels are closed by a surface of the front vent cap for the right frame in which the vent holes are not formed, and the opened other ends of some of the plurality of right channels are closed by a surface of the rear vent cap for the right frame in which the vent holes are not formed, and the opened other ends of the others of the plurality of right channels are in communication with the outside through the vent holes formed in the rear vent cap for the right frame.

7. The battery pack of claim 6, further comprising:

a guide wall for the left channel disposed on each left channel and guiding a gas to the vent hole corresponding to each left channel; and a guide wall for the right channel disposed on each right channel and guiding a gas to the vent hole corresponding to each right channel.

8. The battery pack of claim 6, wherein in each left channel, an end portion having a greater distance of a distance from a communication hole formed in each left channel to one end of each left channel and a distance from the communication hole to the other end of each left channel is in communication with the outside, and in each right channel, an end portion having a greater distance of a distance from a communication hole formed in each right channel to one end of each right channel and a distance from the communication hole to the other end of each right channel is in communication with the outside.

9. The battery pack of claim 6, wherein in each left channel, an end portion that is in communication with the outside, of one end and the other end of a left channel of any one floor of left channels of two floors adjacent to each other and an end portion that is in communication with the outside, of one end and the other end of a left channel of the other floor of the left channels of the two floors adjacent to each other are opposite to each other, and in each right channel, an end portion that is in communication with the outside, of one end and the other end of a right channel of any one floor of right channels of two floors adjacent to each other and an end portion that is in communication with the outside, of one end and the other end of a right channel of the other floor of the right channels of the two floors adjacent to each other are opposite to each other.

10. The battery pack of claim 1, wherein the internal space of each of the plurality of module spaces comprises a battery cell assembly formed by stacking a plurality of battery cells each comprising an electrode tab lead portion and a heat exchange portion and a heat conduction member disposed between the heat exchange portion and the plate, and the electrode tab lead portion comprises a sealed surface formed by thermally compressing a pouch accommodating an electrode assembly, and the heat exchange portion makes surface contact with the heat conduction member and is free of any sealing surface.

11. The battery pack of claim 10, wherein the electrode tab lead portion further comprises a corner portion at one end thereof, and the corner portion protrudes more toward the plate than the heat exchange portion, and the plate comprises a step portion for accommodating the protruding corner portion.

12. An electric vehicle comprising:

the battery pack of claim 1; and a motor receiving power supplied from the battery pack.

13. The battery pack of claim 1, wherein the internal space of each of the plurality of module spaces comprises a battery cell assembly formed by stacking a plurality of battery cells each comprising an electrode tab lead portion and a heat exchange portion and a heat conduction member disposed between the heat exchange portion and the plate, and the electrode tab lead portion comprises a sealed surface formed by thermally compressing a pouch accommodating an electrode assembly, and the heat exchange portion is in contact with the heat conduction member without the sealed surface.

14. The battery pack of claim 13, wherein the electrode tab lead portion further comprises a corner portion at one end thereof, and the corner portion protrudes more toward the plate than the heat exchange portion, and the plate comprises a step portion for accommodating the protruding corner portion.

* * * * *